Nov. 24, 1964     D. J. BLUNDEN     3,158,107
CARRIER RACK ASSEMBLY FOR USE ON TRANSPORTATION VEHICLES
Filed April 3, 1961     2 Sheets-Sheet 1

INVENTOR.
Donald J. Blunden
BY Whittemore,
Hulbert + Belknap
ATTORNEY

Nov. 24, 1964   D. J. BLUNDEN   3,158,107
CARRIER RACK ASSEMBLY FOR USE ON TRANSPORTATION VEHICLES
Filed April 3, 1961   2 Sheets-Sheet 2
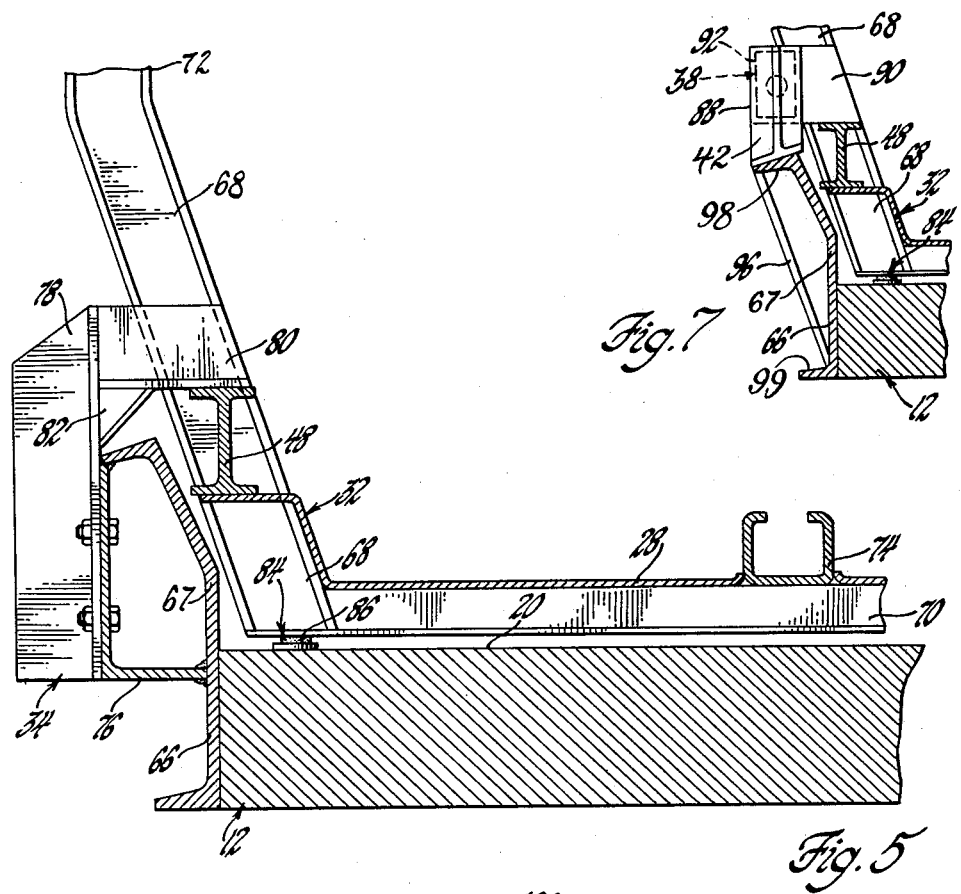
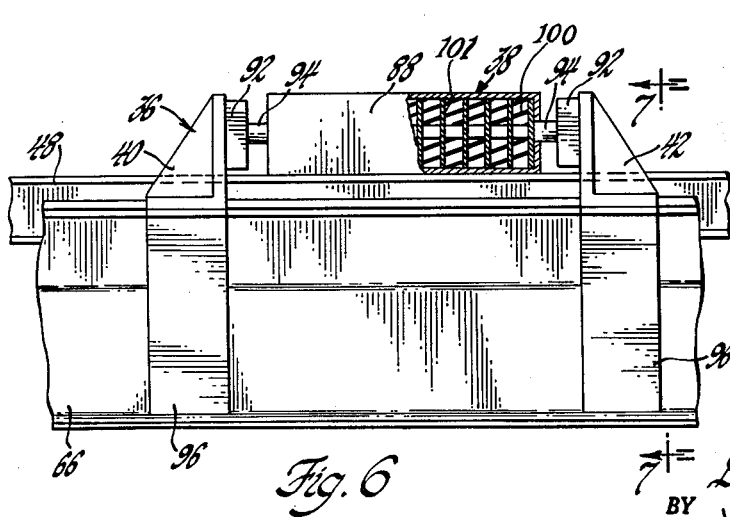
INVENTOR.
Donald J. Blunden
BY Whittemore,
Hulbert & Belknap
ATTORNEY United States Patent Office 3,158,107
Patented Nov. 24, 1964

3,158,107
CARRIER RACK ASSEMBLY FOR USE ON
TRANSPORTATION VEHICLES
Donald J. Blunden, Detroit, Mich., assignor to Whitehead
& Kales Company, River Rouge, Mich., a corporation
of Michigan
Filed Apr. 3, 1961, Ser. No. 100,256
3 Claims. (Cl. 105—368)

This invention relates to carrier racks in general and more particularly to carrier rack assemblies for use by the railroads and other transportation vehicles to haul automotive vehicles and other freight.

Most freight companies now offer piggy-back and storage container transportation facilities wherein a preloaded vehicle trailer or storage container is carried on another and larger transportation vehicle; as for example a flat deck highway vehicle, railway car, ocean traveling ship and the like. The larger transportation vehicle normally includes a receptive deck area upon which the detachable trailer units or containers may be tied down and which is otherwise unobstructed for return loads of like or different kinds.

As will be appreciated, the closest possible arrangement of the freight loaded carriers on the larger transportation vehicle is important to enable carrying the most productive load. At the same time, safeguards must be maintained against relative movements between the carrier means which might otherwise cause damage thereto or to the cargo carried; as in having them rub or bump against each other.

The problems of this mode of transportation are perhaps best appreciated in considering the transportation of automotive vehicles by carrier racks mounted on railway flat cars.

With the more prevalent use of diesel power and the elimination of the older soot and hot ash producing power plants, an open carrier rack is most practical for carrying automotive vehicles by railroad carriers. Such open carrier-racks must be relatively simple in construction to avoid undue weight as well as material and labor costs and must also be sturdy and dependable to carry the valuable load entrusted thereto. The carrier racks are preferably removable from the railroad flat cars to enable the flat cars to be returned to general service whenever they are needed. This in turn requires dependable means of securing the racks to the flat cars and the automobiles or other vehicles to the racks.

As will be appreciated, there is a decided advantage in using the longest available flat cars for hauling automotive carrier racks since the additional length will normally enable more automotive vehicles to be carried thereon. However, the use of correspondingly longer carrier racks presents obvious disadvantages as regards having such racks readily removable from the rail cars. Furthermore, the longer rail cars have their rail trucks disposed further apart and there is a definite flexure of the flat car at the midsection thereof while in transit. This is no problem with the flat bed loading normally proposed for flat car carriers but is a problem with full height railroad cars or racks due to the additional reinforcement and added weight needed to accomplish such strengthening. This is one of the reasons why railroad carriers have not made other than flat cars to the maximum lengths which are permissible.

It will also be appreciated that a full length enclosed or open carrier on a full length rail car, with a full load, presents a formidable dead weight which must in some manner be safeguarded against shocks due to sudden stops and the bumping of rail cars for disconnecting and connecting different ones thereof together. A sizable shock absorber system would be required to be built into either the removable unit carrier or the flat car itself.

It is an object of this invention to provide a freight receptive carrier rack including means of cooperative attachment to other racks and closer associations.

It is an object of this invention to provide a freight receptive carrier rack or container having means of cooperative attachment to other carrier racks or containers and allowing closer nesting together thereof without concern for damage thereto or the cargo carried thereby.

It is an object of this invention to teach the use of separate interconnected carrier racks or containers rather than one large rack or container and to have such connection enable permissive relative movement therebetween which is non-injurious to the carrier means or their cargo and still affords intercooperation therebetween.

It is also an object of this invention to provide carrier racks and containers which are individually shorter in length, and therefore easier to handle, but are collectively longer in length for greater overall freight carrying capacity. Furthermore, the smaller cargo carrying means may be more readily accommodated by conventional shock absorber means, tie-downs, and the like without necessitating special innovations for the overall size, weight, etc., of the freight load involved.

Another object of this invention is to provide a carrier rack or storage container assembly of maximum permissive dimensions for use on the deck areas of larger transportation vehicles which are subject to flexure while in transit. In this regard, this invention provides for a connection between the individual freight carrying means which enables such flexing of the deck area and avoids the necessity of heavy structural reinforcement of the deck areas or between the cargo carriers themselves.

Still another object of this invention is to teach the use of dual carrier racks which are interconnected and capable of supporting a load therebetween.

A further object of this invention is to provide readily demountable and separable carrier means having individual means of resisting shock loads and interconnected together in a manner affording cooperation therebetween.

These and other objects and advantages to be gained in the practice of this invention will be more fully understood and appreciated upon a reading of the following specification and with reference to the accompanying drawings wherein:

FIGURE 5 is a vertical sectional view taken on the line 5—5 of FIGURE 1.

FIGURE 6 is an enlarged side elevational view of one of the shock absorber mountings provided on the railway carrier with parts of the shock absorber broken away and in section.

FIGURE 7 is a vertical sectional view taken on the line 7—7 of FIGURE 6.

Figure 1:
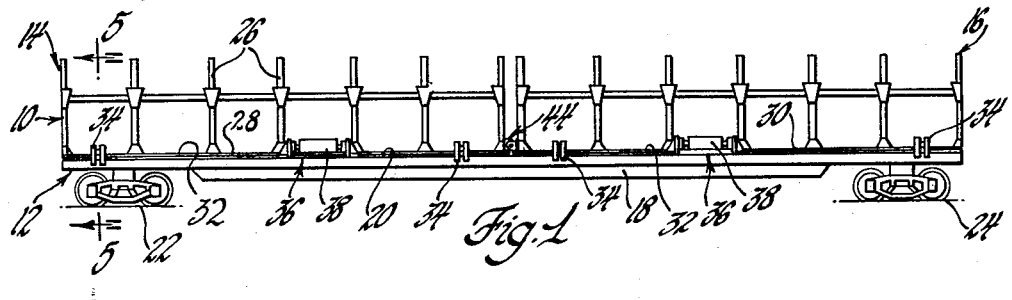
FIGURE 1 is a side elevational view of the railway carrier having the different features of this invention incorporated therein.

The railway carrier 10, shown by FIGURE 1, includes a railway flat car 12 having a pair of carrier racks 14 and 16 disposed thereon.

The railway flat car includes a center sill underbody structure 18 supporting a horizontal deck section 20 and having railway trucks 22 and 24 provided near opposite ends thereof. The flat car 12 is preferably of maximum length and has the railway trucks 22 and 24 disposed sufficiently near the ends of the horizontal deck section 20 and as far apart as possible to preclude non-regulation overhang of either the ends or the middle section thereof during transit of the rail car around a curve. It will be appreciated that despite the center sill underbody structure 18 the spacing of the trucks 22 and 24 will result in a flexure of the flat car 12 at the mid section thereof while in transit.

The carrier racks 14 and 16 are substantially similar and in describing the racks similar reference numerals will be used to identify relatively similar parts thereof.

The carrier racks each include an open structural framework 26 having longitudinally spaced deck sections 28 and 30 receptive of automotive vehicles (not shown) thereon. The side frames of the racks are spaced laterally apart and are mounted upon the vehicle supporting deck sections 28 and 30. Accordingly, a through passage is provided for the loading and unloading of vehicles within and between the two carrier racks. In use, the racks each support two vehicles on their respective deck sections and an additional two vehicles straddled between each of their respectively aligned decks.

The structure of the carrier racks will be later described in further detail. However, for the present, it will suffice to mention that the racks 14 and 16 each include parallel laterally spaced side rail base sills 32 extending the full length of the outer lower edges thereof.

Referring to FIGURE 1, it will be noted that the carrier racks 14 and 16 are retained on the horizontal deck section 20 of the flat car 12 by means of clamps 34 secured to the flat car and disposed for engagement with side rails 48 of the base sills 32 of the carrier racks. Upon removal of the clamps 34 the carrier racks 14 and 16 may be removed from the flat car 12. The carrier racks are not otherwise permanently secured to the flat car.

Aside from the clamps 34 which retain the carrier racks on the flat car and, accordingly, restrain vertical movement of the racks relative to the flat car, shock absorber means 36 are provided to restrain longitudinal movement of the racks. Each shock absorber unit 38 is secured to a side rail 48 of a base sill 32 of a rack and is disposed between longitudinally spaced stops 40 and 42 respectively rigidly mounted upon a side rail 66 of the flat car 12. This structure will also be later described in further detail.

In addition to the clamps 34 and the shock absorber means 36 for restraining relative movement of the carrier racks on the flat car, two pivotal connections 44 are provided between the closely spaced adjacent ends of the racks at the mid-section of the flat car. These connections, as will be shown, connect the two carrier racks together for coordinated longitudinal movement thereof and are permissive of the flexure of the flat car at the mid-section thereof. The carrier racks 14 and 16 are not otherwise connected together than through the pivotal connections 44.

Figure 2:
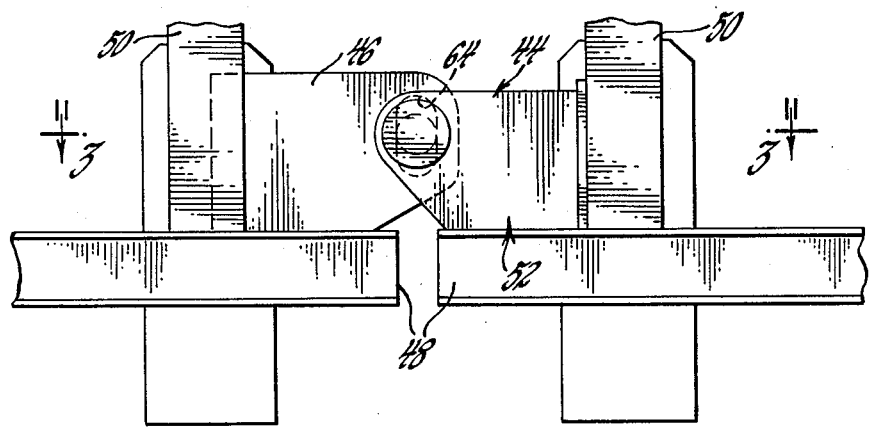
FIGURE 2 is an enlarged and fragmentary side elevational view of one of the connections provided between the two carrier racks illustrated in FIGURE 1.
Figure 3:
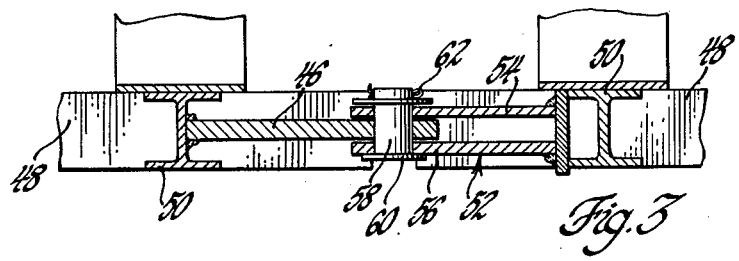
FIGURE 3 is a longitudinal sectional view taken on the line 3—3 of FIGURE 2.

The pivotal connections 44 between the two carrier racks 14 and 16 are alike, and one such connection is best shown by FIGURES 2 and 3. It includes a vertically disposed plate member 46 secured to the upper surface of a side rail member 48 of the base sill 32 of one of the racks, and to the vertical end post 50 of the side frame of such rack. A bifurcated member 52 is secured to the upper surface of a side rail member 48 of the next adjacent rack and to its vertical end post 50. The extended arms 54 and 56 of the bifurcated member 52 are receptive of the plate member 46 therebetween and a pivot pin 58 connects the respective members together. The pivot pin head 60 and cotter pin 62 retain the pin 58 in position.

Figure 4:
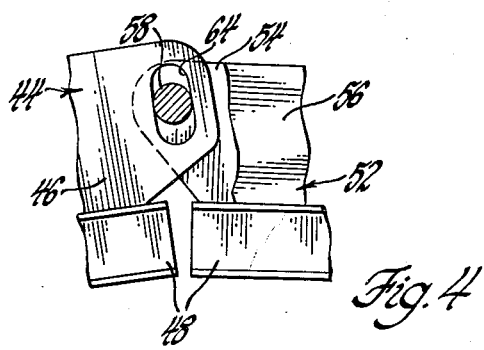
FIGURE 4 is a fragmentary elevational view of one of the connections between the carrier racks, and showing the connecting members thereof in different relative and exaggerated positions.

Referring to FIGURES 2 and 4, it will be noted that the pivotal connection plate 46 includes an elongated slot 64 through which the pivot pin 58 extends. The slot is elongated in a vertical direction and, accordingly, does not allow for any relative horizontal movement between the two carrier racks 14 and 16. However, it does allow for limited relative vertical movement of the two racks such as might occur during the loading of the respective racks or as a consequence of uneven loading thereof. Further, it enables greater freedom of vertical relative movement between the two racks such as may occur during the flexure of the flat car at its mid-section. It will be appreciated that FIGURE 4 illustrates an exaggerated condition of the relative disposition of the pivotal connection forming parts and side rail members and is principally for discussion purposes.

Referring now to FIGURE 5, the railway flat car 12 has at each side edge of the deck section 20 thereof a structural side rail 66 secured to and extending the full length thereof and standing above the deck section 20 to provide a drop center deck area. The carrier racks are received on the drop center deck area and have their base sills 32 disposed closely adjacent to the structural side rails 66.

Suitable structural crossbars 70 are provided beneath the cargo supporting deck 28 and are secured to inwardly inclined portions 68 of vertical posts 72 of the side frames of the carrier rack. Longitudinally extending cargo tie-down channels 74 are mounted on top of the spaced crossbars 70 between laterally spaced portions of the deck 28 and afford further structural strengthening of the carrier racks.

An L-shaped support bracket 76 is welded to the structural side rail 66 of the flat car 12 at appropriate locations and has the carrier rack engaging clamps 34 bolted thereto. The inverted L-shaped clamps include vertically and horizontally disposed parts 78 and 80, respectively, welded together and having a strengthening gusset 82 therebetween. The horizontal clamp part 80 extends over the side rail 48 of the base sill 32. In this manner the clamps 34 retain the carrier racks 14 and 16 on the rail cars 12 and restrain undue vertical movement thereof. The racks may be removed from the flat car by simply unbolting the clamps 34 from the L-shaped support brackets 76 welded to the side rails 66 of the flat car.

Upon closer examination of FIGURE 5 it will be noted that the carrier racks 14 and 16 are supported on the flat car deck section 20 upon antifriction means 84. Such means include a wear-resistant self-lubricating antifriction pad 86 and is disposed under the crossbars 70 and below the inwardly inclined portions 68 of the vertical posts 72 of the side frames of the carrier racks. Accordingly, the racks are relatively free-floating on the flat car deck 20, in a longitudinal direction; being restrained laterally and vertically by the upwardly projecting portions 67 of the flat car side rails 66 and retaining clamps 34.

The shock absorber means 36, previously mentioned, restrain longitudinal movement of the carrier racks. Such means are best shown by FIGURES 6 and 7.

The shock absorber housings 88 are secured by suitable supports 90 to the base sill side rails 48 intermediate the ends of each carrier rack and are located on each side of each carrier rack between a pair of the inwardly inclined portions 68 of the vertical posts 72 of the side frames. Preferably, the housing 88 of each shock absorber unit 38 contains a series of high-resilience rubber rings 100 separated by steel plates 101 with the rubbers rings having a durometer to meet the calculated gross weight of the carrier rack with which used. Horizontal arms 94 extend freely through opposite ends of the housing 88 of each shock absorber unit 38 and are secured to the steel plates 101 within said housing 88 at opposite ends thereof. End blocks 92 are secured to the outer ends of the horizontal arms 94 at opposite ends of each shock absorber unit and are disposed for contact engagement with the stops 40 and 42 provided on the flat car side rails 66 to restrain the racks 14 and 16 against longitudinal movement relative to the deck 20.

The side rails 66 are reinforced by plate members 96 which extend between and are secured to lateral flanges 98 and 99 respectively at the upper and lower edges of said side rails 66.

Referring again to FIGURE 1, it will be noted that the clamps 34, shock absorber means 36 and pivotal connections 44 are substantially longitudinally aligned and are engaged with the respective side rail base sills 32, which are in floating engagement with the horizontal deck section 20 of the flat car 12. This relative longitudinal alignment and engagement with the side rail base sills 32 enables coordinated functioning of the respective restraining members through a common principal structural member. Further, the connection of the carrier racks 14 and 16 though the pivotal connection 44 enables the shock absorber means 36 provided on one rack unit to assist in absorbing any shock moving the other carrier rack unit. At the same time, the pivotal connection enables relative limited freedom of movement of the racks thereover resulting from flexure of the rail car at its mid-section. As will be appreciated, this flexure of the flat car 12 has a minimal effect upon the pivotally connected carrier racks 14 and 16 near the horizontal deck 20 thereof. However, this situation, however slight, is increasingly exaggerated between the carrier racks towards the upper ends thereof.

Extensive study, research and testing have proven the value of the pivotal connection 44 between a pair of carrier racks provided on a railway flat car and intended to carry automotive vehicles thereon and between. The pivotal connection between the adjacently disposed ends of the pair of carrier racks, at each side thereof, rather than a hinge connection across the racks or to the flat car itself has been found particularly advantageous in affording the right combination of relative freedom as regards the individual racks and coordinated control of undesirable relative movement therebetween. The use of the pivotal connection 44 in combination with the other rack engaging and movement restraining components, in the arrangement disclosed, has been found to produce even further advantages, as has been mentioned.

This does not preclude any advantage to the use of the pivotal connection between the carrier racks at other locations. Although not shown, and therefore not discussed in detail, it will be appreciated that the carrier racks could be provided with means of pivotal connection to adjacently disposed carrier racks where mounted on deck areas of sufficient width. Furthermore, the pivotal connection might be provided at an intermediate or upper location between adjacent racks to obtain part of the advantages of this invention without full benefit thereof.

Although a specific and preferred embodiment of this invention has been shown and described, it will be appreciated that certain modifications and improvements are within the scope of the teachings set forth herein. Accordingly, such variations and modifications are to be considered as included within the hereinafter appended claims unless specifically excluded by the language thereof.

I claim:

1. In combination, a railway flat car having an elongated horizontal deck, side rails extending horizontally at and secured to opposite side edges of said deck and having portions projecting upwardly above the upper surface of said deck, a pair of longitudinally extending longitudinally movable elongated freight carrying racks disposed substantially in end-to-end relation and freely mounted upon said deck between said side rails, a pivotal connection between the adjacent ends of said racks, said racks being held against lateral displacement relative to said deck by the upwardly projecting portions of said side rails, said racks having substantially horizontal longitudinally extending rail members at opposite sides thereof, longitudinally spaced brackets upon the outer sides of and secured to said side rails, means secured to said brackets and extending over the rail members of said racks for holding said racks against vertical displacement relative to said deck, and means respectively carried by said rail members and by the upwardly projecting portions of said side rails for restraining said racks against longitudinal movement relative to said deck, including shock absorber units having longitudinally extending elongated housings containing shock absorbing means including alternately arranged rigid and resilient elements, said housings being located above the upwardly projecting portions of the side rails of said flat car and secured to the rail members of said racks, horizontal arms extending through opposite ends of the housing of each shock absorber unit and engaging certain of the rigid elements of said shock absorbing means, said horizontal arms being provided at their outer ends with blocks, and stops rigidly mounted upon the upwardly projecting portions of the side rails of said flat car in longitudinally spaced relation to opposite ends of said housings and in the path of and constituting abutments for said blocks.

2. In combination, a railway flat car having an elongated horizontal deck, side rails extending horizontally at and secured to opposite side edges of said deck and having portions projecting upwardly above the upper surface of said deck, a pair of longitudinally extending longitudinally movable elongated freight carrying racks disposed substantially in end-to-end relation and freely mounted upon said deck between said side rails, a pivotal connection between the adjacent ends of said racks, said racks being held against lateral displacement relative to said deck by the upwardly projecting portions of said side rails, said racks having substantially horizontal longitudinally extending rail members at opposite sides thereof, longitudinally spaced brackets upon the outer sides of and secured to said side rails, means secured to said brackets and extending over the rail members of said racks for holding said racks against vertical displacement relative to said deck, and means respectively carried by said rail members and by the upwardly projecting portions of said side rails for restraining said racks against longitudinal movement relative to said deck, the pivotal connection between the adjacent ends of said racks including vertically disposed parallel plates secured to one of said pair of racks and provided with a horizontally extending pivot pin, and a vertically disposed plate secured to the other of said pair of racks, projecting between said parallel plates, and having a vertically extending elongated slot therein receiving said pivot pin, whereby relative vertical movement between said pair of racks is permitted.

3. In combination, a railway flat car having an elongated horizontal deck, side rails extending horizontally at and secured to opposite side edges of said deck and having portions projecting upwardly above the upper surface of said deck, a pair of longitudinally extending longitudinally movable elongated freight carrying racks disposed substantially in end-to-end relation and freely mounted upon said deck between said side rails, a pivotal connection between the adjacent ends of said racks, said racks being held against lateral displacement relative to said deck by the upwardly projecting portions of said side rails, said racks having substantially horizontal longitudinally extending rail members at opposite sides thereof, longitudinally spaced brackets upon the outer sides of and secured to said side rails, inverted substantially L-shaped clamps having the upright portions thereof detachably secured to said brackets and having the horizontal portions thereof extending over the rail members of said racks for holding said racks against vertical displacement relative to said deck, and means respectively carried by said rail members and by the upwardly projecting portions of said side rails for restraining said racks against longitudinal movement relative to said deck, including shock absorber units having longitudinally extending elongated housings containing shock absorbing means including alternately arranged rigid and resilient elements, said housings being located above the upwardly projecting portions of the side rails of said flat car and secured to the rail members of said racks, horizontal arms extending through opposite ends of the housing of each shock absorber unit and engaging certain of the rigid elements of said shock absorbing means, said horizontal arms being provided at their outer ends with blocks, and stops rigidly mounted upon the upwardly projecting portions of the side rails of said flat car in longitudinally spaced relation to opposite ends of said housings and in the path of and constituting abutments for said blocks.

References Cited in the file of this patent

UNITED STATES PATENTS

| | | |
|---|---|---|
| 1,675,562 | Kellett | July 3, 1928 |
| 1,693,193 | Duryea | Nov. 27, 1928 |
| 1,750,128 | Romine | Mar. 11, 1930 |
| 1,750,129 | Romine | Mar. 11, 1930 |
| 1,761,969 | Chalmers | June 3, 1930 |
| 1,843,988 | Randall | Feb. 9, 1932 |
| 1,862,632 | Perin | June 14, 1932 |
| 2,047,954 | Fitch | July 21, 1936 |
| 2,072,988 | Kellett | Mar. 9, 1937 |
| 2,137,255 | Tuttle | Nov. 22, 1938 |
| 2,166,948 | Fitch | July 25, 1939 |
| 2,191,222 | Sheehan | Feb. 20, 1940 |
| 2,519,721 | Taylor | Aug. 22, 1950 |
| 2,708,887 | Van Alstine | May 24, 1955 |
| 2,856,864 | Harbulak | Oct. 21, 1958 |
| 2,942,912 | Lucas et al. | June 28, 1960 |
| 3,011,219 | Williams | Dec. 5, 1961 |

OTHER REFERENCES

"ACF Markets Cushioned Auto Racks," page 28, Railway Age Magazine of Dec. 5, 1960.

"Frisco Tri-Level Auto Car," page 23, Railway Age Magazine of Feb. 15, 1960.